(12) United States Patent
Holt

(10) Patent No.: US 10,638,881 B1
(45) Date of Patent: May 5, 2020

(54) GRILL TEMPERATURE CONTROLLER

(71) Applicant: Michael W. Holt, Atlanta, GA (US)

(72) Inventor: Michael W. Holt, Atlanta, GA (US)

( * ) Notice: Subject to any disclaimer, the term of this patent is extended or adjusted under 35 U.S.C. 154(b) by 1147 days.

(21) Appl. No.: 14/950,350

(22) Filed: Nov. 24, 2015

(51) Int. Cl.
*A47J 37/07* (2006.01)

(52) U.S. Cl.
CPC .................. *A47J 37/0754* (2013.01)

(58) Field of Classification Search
CPC ............................. A47J 37/0754; A47J 37/07
USPC ........................................................... 99/330
See application file for complete search history.

(56) References Cited

U.S. PATENT DOCUMENTS

| | | | | |
|---|---|---|---|---|
| 2002/0003381 | A1* | 1/2002 | Nelson | F01P 7/048 310/67 R |
| 2008/0136221 | A1* | 6/2008 | Hartmann | B60H 1/00821 297/180.14 |
| 2008/0168977 | A1* | 7/2008 | Daud | A47J 37/0754 126/25 B |
| 2008/0201727 | A1* | 8/2008 | Byers | G06F 9/4411 719/327 |

OTHER PUBLICATIONS

Bryan Mayland and Snakejake1, CapnBry/HeaterMeter, GitHub, PID controller theory updated Jun. 30, 2014 and PID Tuning updated Jul. 3, 2015. (Year: 2015).*
Holt, et al., "State-Space Conditional Integral Feedback Temperature Control of Kamado-Style Cooker," Georgia Tech Senior Design Expo, May 2014.
Wikipedia, "Kamado," https://en.wikipedia.org/wiki/Kamado, Mar. 5, 2015, 2 pages.
Rock's Barbeque L.L.C., "Rock's Bar-B-Que—Features," https://www.rocksbarbque.com/Features.html, Mar. 2013, 2 pages. https://www.bbqguru.com/productinfo/howtheywork.
The BBQ Guru, "The Science Behind Better BBQ Temperature Control," https://www.bbqguru.com/productinfo/howtheywork, Sep. 8, 2015, 4 pages.
Flame Boss, "Flame Boss," https://www.flameboss.com/FB200_WiFi_Universal_smoker_controller, Sep. 21, 2014, 6 pages.

* cited by examiner

*Primary Examiner* — Serkan Akar
*Assistant Examiner* — Spencer H. Kirkwood
(74) *Attorney, Agent, or Firm* — Harrity & Harrity, LLP

(57) ABSTRACT

A device is provided that may include an attachment component configured to attach the device to a grill. The device may include a temperature sensor configured to detect a grill temperature of the grill and an airflow control component configured to control an airflow into the grill. The airflow control component may be adjustable to permit a plurality of airflow rates into the grill. The device may include one or more processors to set a target temperature for the grill, detect the grill temperature of the grill via the temperature sensor, determine an airflow rate based on the target temperature, the grill temperature, and a value that changes as a function of time. The processor may cause the device to set the airflow control component, based on the airflow rate, to control the airflow into the grill.

17 Claims, 9 Drawing Sheets

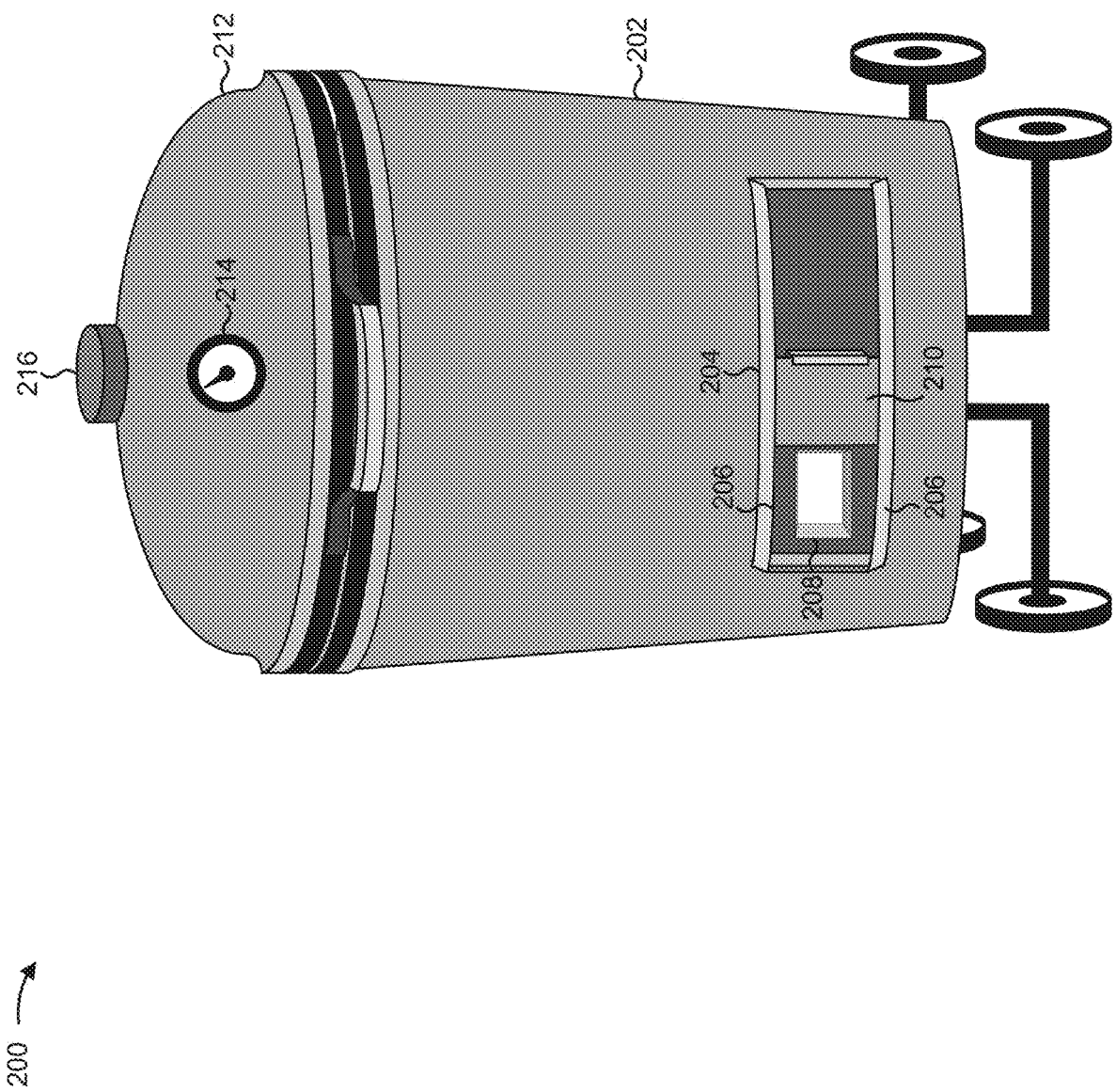

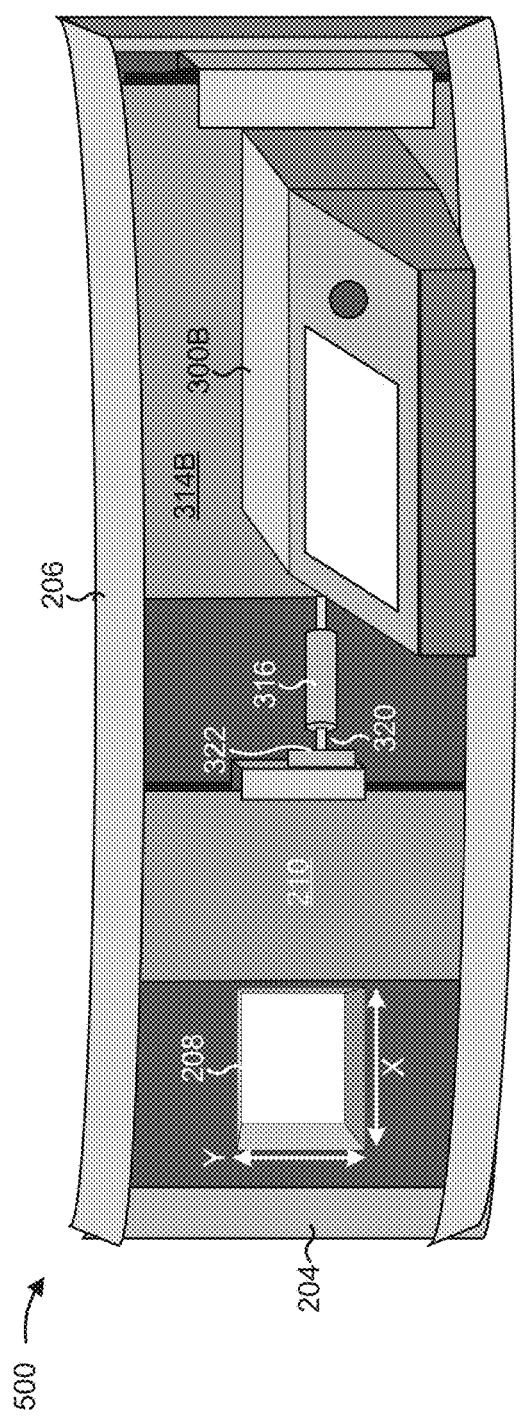
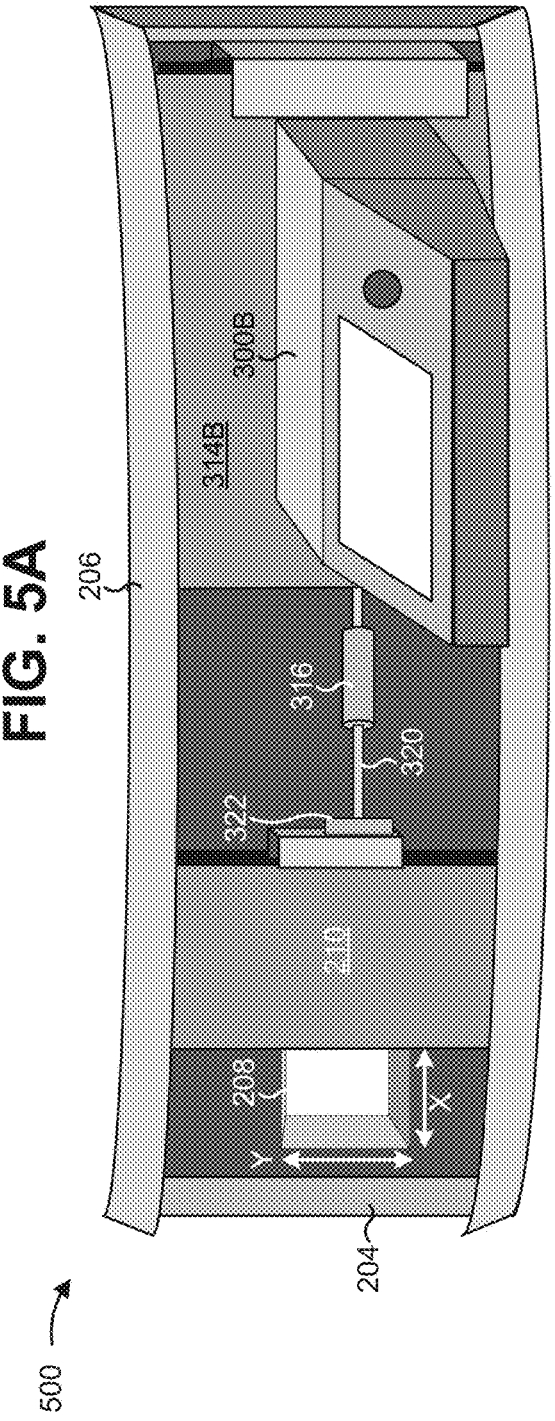
FIG. 5A
FIG. 5B

GRILL TEMPERATURE CONTROLLER

BACKGROUND

Kamado grills may operate over a wide range of temperatures, which allows kamado grills to be used as smokers, grills, or high temperature ovens for baking. When cooking for long periods of time, a user of a kamado grill may desire to keep the kamado grill at a constant temperature. Temperature controllers, with a one-speed fan, have been provided to control airflow into a kamado grill to control a grill temperature.

BRIEF DESCRIPTION OF THE DRAWINGS

FIG. 2 is a diagram of example components of a grill;

FIGS. 5A and 5B are diagrams of an example implementation of how a control device may operate and attach to a grill.

DETAILED DESCRIPTION

Figure 1:
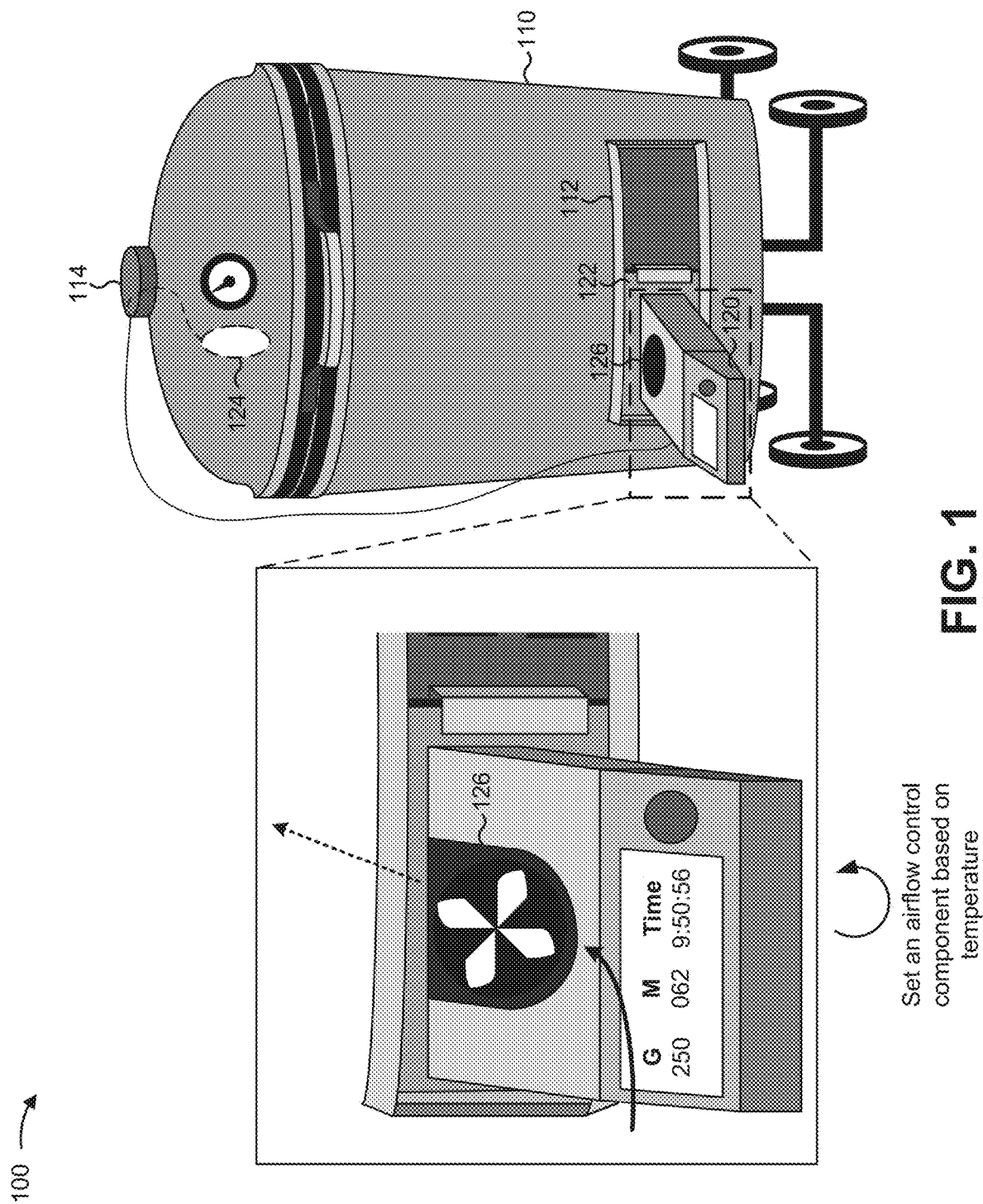
FIG. 1 is a diagram of an overview of an example implementation described herein.

The following detailed description of example implementations refers to the accompanying drawings. The same reference numbers in different drawings may identify the same or similar elements.

Kamado grills are sensitive to small airflow adjustments, making it difficult to maintain a stable temperature, even when one-speed temperature controllers are used. For example, one-speed temperature controllers have fans that are either on or off, but that do not provide control of the speed of the fan. Accordingly, one-speed temperature controllers are not capable of providing fine airflow adjustments to a kamado grill, resulting in an inability to keep a constant temperature.

For example, the amount of airflow provided by a one-speed temperature controller may cause the grill temperature to spike. This temperature spike may cause the grill temperature to be greater than a desired temperature. Because kamado grills are designed to be heat efficient and to minimize heat loss, a temperature spike above the desired temperature may take a long period of time (e.g., minutes, hours, etc.) to cool to the desired temperature. Accordingly, one-speed temperature controllers may cause the grill temperature to be above the desired temperature, for a long period of time, due to the temperature spike and overcook the food.

One strategy used to avoid such a problem may include waiting to turn on a one-speed temperature controller until the grill temperature is far enough below the desired temperature so that the temperature spike does not cause the grill temperature to exceed the desired temperature. However, this strategy may result in a long period of time (e.g., minutes, hours, etc.) that the grill temperature is below the target temperature while waiting for the grill temperature to be the appropriate amount below the target temperature before a fan is turned on. Furthermore, only operating the fan at temperatures that are far below the target temperature may increase the amount of time it takes for the grill temperature to finally reach the target temperature. Such an increase in time may be problematic when a lid of the grill is removed during cooking and the grill temperature needs to be quickly raised back to the target temperature.

Implementations described herein provide a temperature controller with an airflow control component that is adjustable to control different airflow rates into a grill. For example, implementations described herein provide a temperature controller with an adjustable speed blower. An algorithm is provided for adjusting the speed of the blower to keep the grill temperature at a target temperature. The algorithm may adjust the speed of the blower to control airflow into the grill to avoid temperature spikes above the target temperature and to quickly increase the grill temperature when the grill temperature is below the target temperature. Additionally, or alternatively, implementations described herein provide a temperature controller with a linear actuator for adjusting the position of a draft door on a grill. The algorithm may adjust the position of the draft door to control airflow into the grill and control the temperature of the grill.

FIG. 1 is a diagram of an overview of an example implementation 100 described herein. As shown in FIG. 1, example implementation 100 may include a grill 110 and a control device 120.

As shown in FIG. 1, grill 110 (e.g. a kamado grill, a barbecue grill, etc.) may include a draft assembly 112 and a top vent 114. Draft assembly 112 may include a draft opening that allows air to flow into grill 110 that provides oxygen for burning a fuel (e.g., charcoal or wood) (not shown) therein. Air and smoke from burning the fuel may escape through top vent 114.

Control device 120 may include a plate 122, a temperature sensor 124, and an airflow control component 126. As illustrated in FIG. 1, airflow control component 126 may be a blower or a fan.

As shown in FIG. 1, control device 120 may attach to grill 110 by inserting plate 122 into draft assembly 112 and configuring plate 122 to cover the draft opening of draft assembly 112. When control device 120 is attached to grill 110, airflow control component 126 may be positioned adjacent to the draft opening of draft assembly 112 and configured to force air from outside of grill 110 through the draft opening of draft assembly 112 and into grill 110. In some implementations, temperature sensor 124 may include a cable that connects temperature sensor 124 to a casing of control device 120. The cable may be placed outside of grill 110 from the casing of control device 120 to top vent 114. The cable may be inserted into top vent 114 when temperature sensor 124 is located inside of grill 110. In some implementations, temperature sensor 124 may connect to control device 120 via a wireless connection to avoid the need for a chord.

Assume that a user inputs information indicating a target temperature (e.g., a desired cooking temperature) into control device 120 and lights grill 110. Control device 120 may continually adjust a setting of airflow control component 126 (e.g., a speed at which a fan rotates), thereby controlling airflow into the grill, based on factors including a difference between the target temperature and a grill temperature detected by temperature sensor 124, a control error integrator representing a value that grows as a function of time (e.g., an amount of time since control device 120 started adjusting the speed of airflow control component 126), a time constant of the grill representing how long it takes the grill temperature to reflect changes in the speed of the blower, a proportional gain constant, an integrator constant, and/or a non-integration constant. In some implementations, the algorithm used by control device 120 to adjust the setting of airflow control component 126 may be over and/or critically damped to bring the grill temperature even with the target temperature without the grill temperature oscillating around the target temperature.

In this way, control device 120 may quickly (e.g., more quickly than a one-speed fan) raise the grill temperature to the target temperature when the grill temperature is below the target temperature while avoiding a temperature spike that would cause the grill temperature to exceed the target temperature. Accordingly, control device 120 may consistently keep the grill temperature at the target temperature.

FIG. 2 is a diagram of example components of a grill 200. Grill 200 may be a kamado grill. As used herein, a kamado grill may refer to any type of kamado grill or kamado-style grill. For example, grill 200 may include kamado grills or kamado-style grills manufactured by such companies as Big Green Egg™, Primo™, and Kamado Joe™. In some implementations, grill 200 may be any kind of charcoal or wood burning grill, such as a barbecue grill. Grill 200 may correspond to grill 110 in FIG. 1.

As shown in FIG. 2, grill 200 may include an outer shell 202, a draft assembly 204, a track 206, a draft opening 208, a draft door 210, a lid 212, a temperature gauge 214, and/or a vent 216.

Outer shell 202 may be made from a variety of materials including ceramics, steel, terra cotta, clay, or the like. Outer shell 202 may house a firebox (not shown) that is configured to hold a fuel, such as charcoal, wood, or another fuel. Outer shell 202 may include a cooking surface (e.g., a cooking grid, a grill surface, etc.) positioned above the firebox. A user may place food on the cooking surface to cook the food while the fuel burns.

Draft assembly 204 may be may be positioned on a lower side of outer shell 202 that is below the cooking surface. Draft assembly 204 may include track 206, draft opening 208, and/or draft door 210. Draft opening 208 may be an opening or hole in outer shell 202 that allows air to flow from outside of grill 200 into grill 200. Track 206 may include two rails in parallel with one another. A top rail may be positioned above draft opening 208 and a bottom rail may be positioned below draft opening 208. Draft door 210 may fit into track 206 and slide along the top rail and the bottom rail. Track 206 may be sufficiently long so that draft door 210 may slide to cover all, part, or none of draft opening 208. The user may manually slide draft door 210 along the track to cover or uncover draft opening 208 and control airflow into grill 200.

Lid 212 may be made of a same material as outer shell 202. Lid 212 may be removable from outer shell 202 to open and close grill 200 or be secured to outer shell 202 via a hinge. Lid 212 may include temperature gauge 214 and/or vent 216. Temperature gauge 214 may be a thermometer or another type of temperature sensor that detects a grill temperature of grill 200. The grill temperature may be an internal temperature of grill 200. Vent 216 may be manually controllable to change a size of an uncovered portion of an opening at a top of lid 212.

The number and arrangement of components shown in FIG. 2 are provided as an example. In practice, grill 200 may include additional components, fewer components, different components, or differently located components than those shown in FIG. 2. Additionally, or alternatively, a set of components (e.g., one or more components) of grill 200 may perform one or more functions described as being performed by another set of components of grill 200.

Figure 3A:
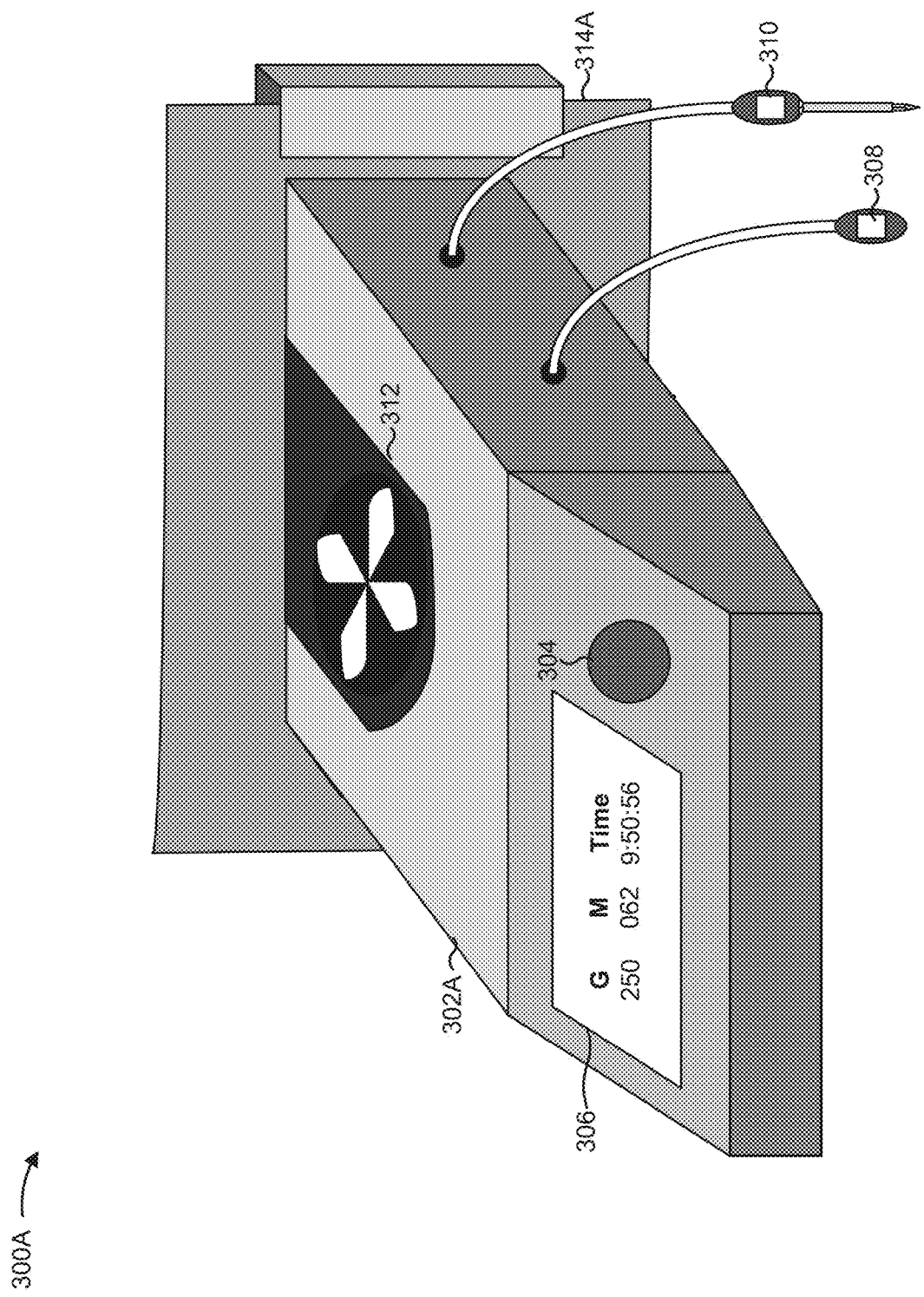
FIG. 3A is a diagram of example components of a control device that includes a blower.

FIG. 3A is a diagram of example components of a control device 300 that includes a blower to control airflow (e.g., a control device 300A).

As shown in FIG. 3A, control device 300A may include a casing 302A, an input component 304, an output component 306, a grill temperature sensor 308, a food temperature sensor 310, a blower 312, and a plate 314A.

Casing 302A may include an external surface of control device 300A and an internal structure configured to hold other components of control device 300A in place. Casing 302A may be made of a heat resistant and fire resistant material that can withstand high temperatures without changing shape. For example, casing 302A may be made of materials such as plastic, resin, fiberglass, ceramic, or the like. Casing 302A may have external openings for input component 304 and output component 306. Casing 302A may have external openings where grill temperature sensor 308 and food temperature sensor 310 may attach to internal components of control device 300A. Casing 302A may have an external opening and housing for blower 312 that is configured to channel air from one side of control device 300A to another side of control device 300A. For example, as shown in FIG. 3, casing 302A may have an external opening and housing that allows blower 312 to extend from a top surface of control device 300A to a back surface of control device 300A, such that air may flow from the top surface of control device 300A, through blower 312, and out the back surface of control device 300A (e.g., into grill 200).

Input component 304 may include a component that permits control device 300A to receive information, such as via user input (e.g., a touch screen display, a keyboard, a keypad, a button, a switch, a microphone, a dial, a knob, etc.). Output component 306 may include a component that provides output information from control device 300A (e.g., a display, a speaker, one or more light-emitting diodes (LEDs), etc.). For example, as shown in FIG. 3A, output component 306 may include a display that displays a grill temperature (G), a food temperature (M), and a cooking time (Time).

Grill temperature sensor 308 may include a component to detect a grill temperature. For example, grill temperature sensor 308 may include a cable that attaches a temperature probe to an internal port or bus of control device 300A. The temperature probe may be inserted inside of grill 200 to detect the grill temperature. In some implementations, the temperature probe of grill temperature sensor 308 may be inserted into grill 200 via vent 216 and positioned near temperature gauge 214. In some implementations, grill temperature sensor 308 may be cordless and wirelessly communicate with internal components of control device 300A.

Food temperature sensor 310 may include a component to detect a food temperature. For example, food temperature sensor 310 may include a cable that attaches a temperature probe to an internal port or bus of control device 300A. The temperature probe may be inserted inside of grill 200 and into the food being cooked to detect the temperature of the food. In some implementations, food temperature sensor 310 may be cordless and wirelessly communicate with internal components of control device 300A.

Blower 312 may be an example of an airflow control component that blows or forces air. In some implementations, blower 312 may be adjustable to blow or force air at multiple speeds other than zero. Blower 312 may have a maximum blower speed and a minimum blower speed (greater than zero) at which blower 312 is capable of operating. Blower 312 may have a blower speed of zero when blower 312 is turned off. As used herein, the terms a "speed of the blower," a "blower speed," or the like, may refer to a volume of air output from blower 312 per unit of time (e.g., cubic feet per minute ($Ft^3$/min)), a rotational speed of fan blades included in blower 312, and/or a speed at which a motor included in blower 312 may operate. Blower 312 may include fan blades to blow or force the air. A speed at which the fan blades rotate may be adjusted to adjust the blower speed. Blower 312 may include a pulse width modulated (PWM) motor or another type of motor to control the speed of the blowing or forcing of the air. The PWM motor may receive a control signal from a processor of blower 312 that instructs the PWM motor to control a speed of blower 312.

Plate 314A may be an example of an attachment component that attaches control device 300A to grill 200. Plate 314A may be a plate or slide attached to one or more sides of casing 302A. In some implementation, plate 314A may be curved or flat. Plate 314A may be configured to attach to or slide into track 206 of grill 200. In some implementations, draft door 210 may be removed from track 206 and plate 314A may replace draft door 210 on track 206. Additionally, or alternatively, plate 314A may be attached to grill 200 using screws, clips, magnets, or similar components that secure plate 314A to grill 200. In some implementations, plate 314A may be attached to a same side of casing 302A as blower 312. Plate 314A may include an opening or a hole so as not to cover blower 312. In other words, plate 314A may be configured to permit air to flow from blower 312 into draft opening 208 of grill 200. In some implementations, plate 314A may be fixed to casing 302A and may not be removable from casing 302A. Alternatively, plate 314A may be attached to casing 302A in a removable fashion. For example, plate 314A may be attachable and detachable from casing 302A. Accordingly, plates 314A of different sizes, which may be configured to attach to different sizes of track 206 on different models of grill 200, may be used with casing 302A. In this way, a same casing 302A of control device 300A may be attached to different kinds of grill 200.

The number and arrangement of components shown in FIG. 3A are provided as an example. In practice, control device 300A may include additional components, fewer components, different components, or differently located components than those shown in FIG. 3A. Additionally, or alternatively, a set of components (e.g., one or more components) of control device 300A may perform one or more functions described as being performed by another set of components of control device 300A.

Figure 3B:
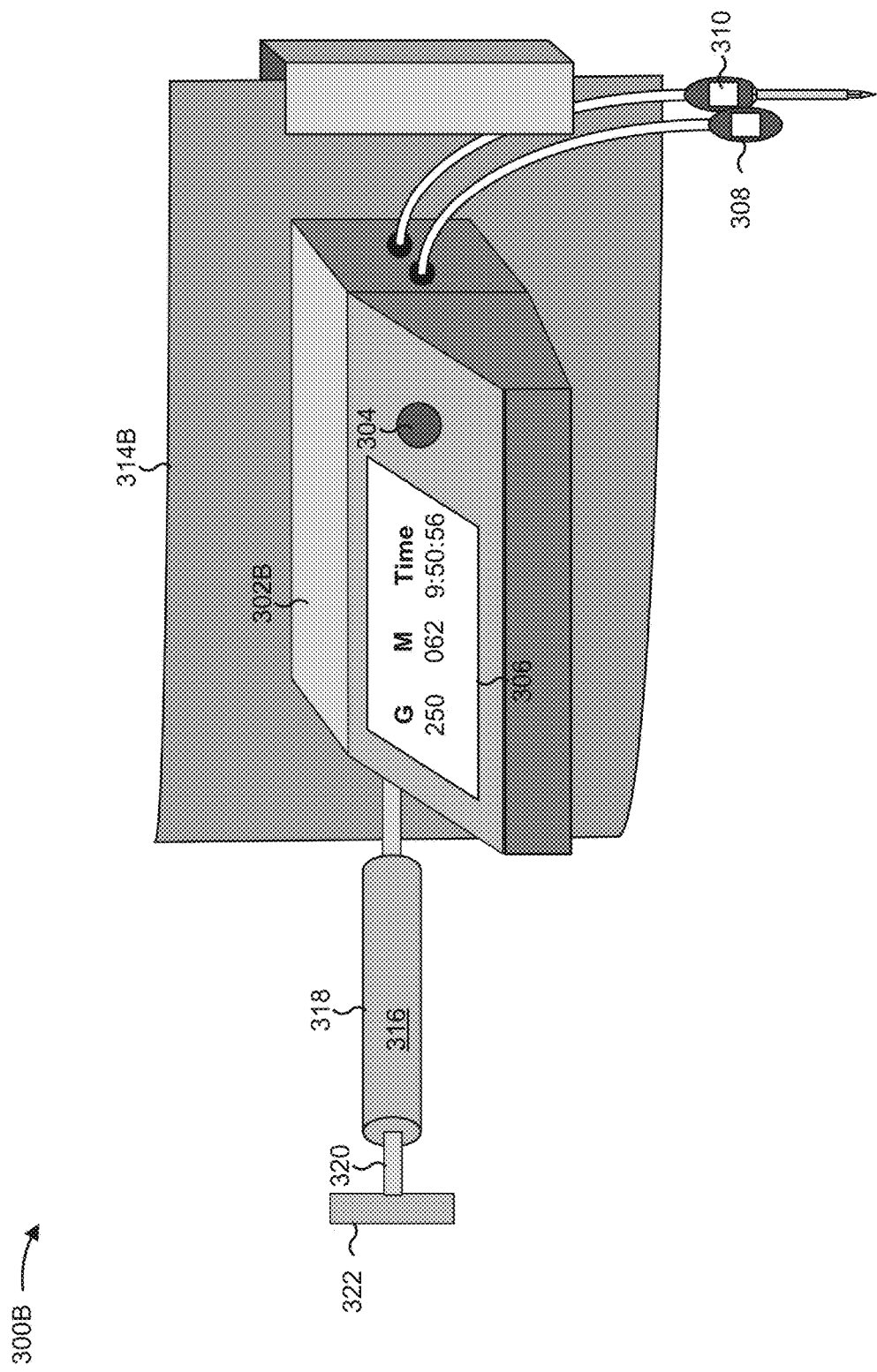
FIG. 3B is a diagram of example components of a control device that includes an actuator.

FIG. 3B is a diagram of example components of control device 300 that includes an actuator (e.g., a control device 300B).

As shown in FIG. 3B, control device 300B may include a casing 302B, input component 304, output component 306, grill temperature sensor 308, food temperature sensor 310, a plate 314B, an actuator 316, a motor 318, a shaft 320, and an end 322.

Casing 302B may include an external surface of control device 300B and an internal structure configured to hold other components of control device 300B in place. Casing 302B may be made of a heat resistant and fire resistant material that can withstand high temperatures without changing shape. For example, casing 302B may be made of materials such as plastic, resin, fiberglass, ceramic, or the like. Casing 302B may have external openings for input component 304 and output component 306. Casing 302B may have external openings where grill temperature sensor 308, food temperature sensor 310, and actuator 316 may attach to internal components of control device 300B.

Input component 304, output component 306, grill temperature sensor 308, and food temperature sensor 310 may be the same as described with respect to FIG. 3A.

Plate 314B may be an attachment component that attaches control device 300B to grill 200. Plate 314B may be a plate or slide attached to one or more sides of casing 302B. In some implementations, plate 314B may be curved or flat. Plate 314B may attach to or slide into track 206 of grill 200. Additionally, or alternatively, plate 314B may be attached to grill 200 using screws, clips, magnets, or similar components that secure plate 314B to grill 200. In some implementations, plate 314B may be fixed to casing 302B and may not be removable from casing 302B. Alternatively, plate 314B may be attached to casing 302B in a removable fashion. For example, plate 314B may be attachable and detachable from casing 302B. Accordingly, plates 314B of different sizes, which may be configured to attach to different sizes of track 206 on different models of grill 200, may be used with casing 302B. In this way, a same casing 302B of control device 300B may be attached to different kinds of grill 200.

Actuator 316 may be an example of an airflow control component. Actuator 316 may be a linear actuator that includes motor 318 that drives shaft 320 along a straight line in two directions. For example, shaft 320 may extend away from casing 302B and retract toward casing 302B. Shaft 320 may include end 322 that attaches to draft door 210. For example, end 322 of shaft 320 may be configured to hook, grab, or fit into a handle of draft door 210. Additionally, or alternatively, end 322 may attach to draft door 210 using a magnet, a suction cup, a screw, an adhesive, or another fastener. In some implementations, rather than end 322 being configured to attach to draft door 210, end 322 may be attached to and/or fixed to a slide, a plate, or a door that replaces draft door 210. Actuator 316 may be configured to adjust a position or length of shaft 320 to a number of different positions or lengths. For example, shaft 320 may extend from casing 302B at varying lengths. In some implementations, shaft 320 may be configured to be adjustable to at least three lengths (e.g., a first length that causes draft door 210 to completely cover draft opening 208, a second length that causes draft door 210 to partially cover draft opening 208, and a third length that causes draft door 210 to completely uncover draft opening 208).

The number and arrangement of components shown in FIG. 3B are provided as an example. In practice, control device 300B may include additional components, fewer components, different components, or differently located components than those shown in FIG. 3B. Additionally, or alternatively, a set of components (e.g., one or more components) of control device 300B may perform one or more functions described as being performed by another set of components of control device 300B.

Furthermore, control device 300A and control device 300B may be combined into a single control device 300 that includes both a blower 312 and an actuator 316.

Figure 3C:
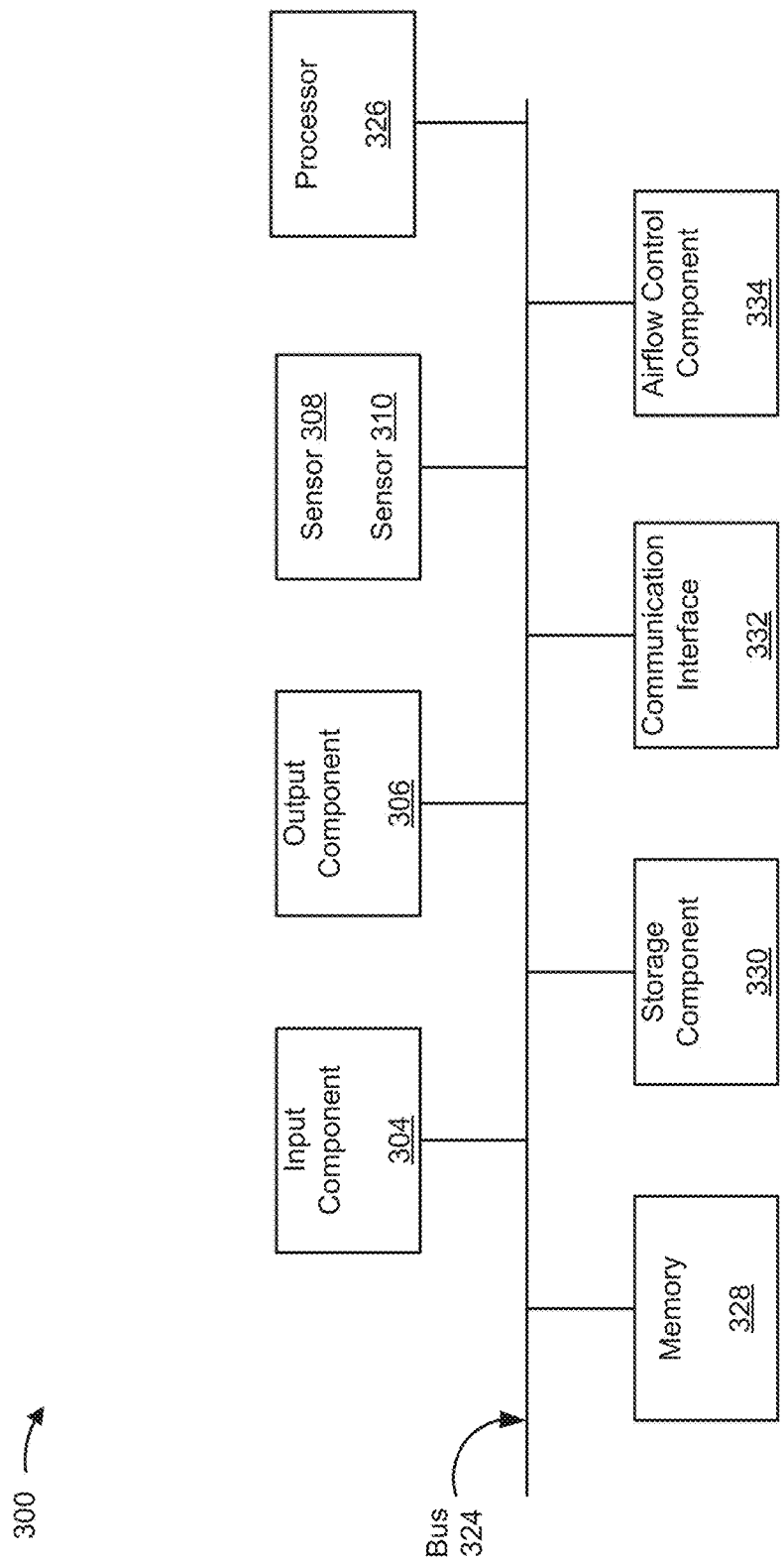
FIG. 3C is a diagram of example internal components of a control device.

FIG. 3C is a diagram of example internal components of control device 300. The term "control device 300" may be refer to control device 300A and/or control device 300B when discussing common features of control device 300A and control device 300B. Some or all of the internal components may additionally, or alternatively, be external components. As shown in FIG. 3C, control device 300 may include input component 304, output component 306, grill temperature sensor 308, food temperature sensor 310, a bus 324, a processor 326, a memory 328, a storage component 330, a communication interface 332, and an airflow control component 334. The term "airflow control component 334" may refer to blower 312 and/or actuator 316 when discussing common features of blower 312 and actuator 316.

Bus 324 may include a component that permits communication among the components of control device 300. For example, input component 304, output component 306, grill temperature sensor 308, food temperature sensor 310, processor 326, memory 328, storage component 330, communication interface 332, and airflow control component 334 may communicate via bus 324.

Processor 326 is implemented in hardware, firmware, or a combination of hardware and software. Processor 326 may include a processor (e.g., a central processing unit (CPU), a graphics processing unit (GPU), an accelerated processing unit (APU), etc.), a microprocessor, a microcontroller, and/or any processing component (e.g., a field-programmable gate array (FPGA), an application-specific integrated circuit (ASIC), etc.) that interprets and/or executes instructions. In some implementations, processor 326 may include one or more processors capable of being programmed to perform a function. In some implementations, processor 326 may send control signals to airflow component 334. For example, processor 326 may send a control signal to blower 312 (e.g., a PWM signal) to adjust a speed of blower 312 and/or to actuator 316 to extend or retract shaft 320.

Memory 328 may include a random access memory (RAM), a read only memory (ROM), and/or another type of dynamic or static storage device (e.g., a flash memory, a magnetic memory, an optical memory, etc.) that stores information and/or instructions for use by processor 326.

Storage component 330 may store information and/or software related to the operation and use of control device 300. For example, storage component 330 may include a hard disk (e.g., a magnetic disk, an optical disk, a magneto-optic disk, a solid state disk, etc.), and/or another type of computer-readable medium, along with a corresponding drive.

Communication interface 332 may include a transceiver-like component (e.g., a transceiver, a separate receiver and transmitter, etc.) that enables control device 300 to communicate with other devices, such as via a wired connection, a wireless connection, or a combination of wired and wireless connections. Communication interface 332 may permit control device 300 to receive information from another device and/or provide information to another device. For example, communication interface 332 may include an Ethernet interface, an optical interface, a coaxial interface, an infrared interface, a radio frequency (RF) interface, a universal serial bus (USB) interface, a Wi-Fi interface, a cellular network interface, or the like.

Control device 300 may perform one or more processes described herein. Control device 300 may perform these processes in response to processor 326 executing software instructions stored by a non-transitory computer-readable medium, such as memory 328 and/or storage component 330. A computer-readable medium is defined herein as a non-transitory memory device. A memory device includes memory space within a single physical storage device or memory space spread across multiple physical storage devices.

Software instructions may be read into memory 328 and/or storage component 330 from another computer-readable medium or from another device via communication interface 332. When executed, software instructions stored in memory 328 and/or storage component 330 may cause processor 326 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

Control device 300 may include a power source (not shown) that provides electricity to control device 300. The power source may include batteries (rechargeable or non-rechargeable), a solar panel, a plug that attaches to an external power source, or the like.

The number and arrangement of components shown in FIG. 3C are provided as an example. In practice, control device 300 may include additional components, fewer components, different components, or differently arranged components than those shown in FIG. 3C. Additionally, or alternatively, a set of components (e.g., one or more components) of control device 300 may perform one or more functions described as being performed by another set of components of control device 300.

Figure 4A:
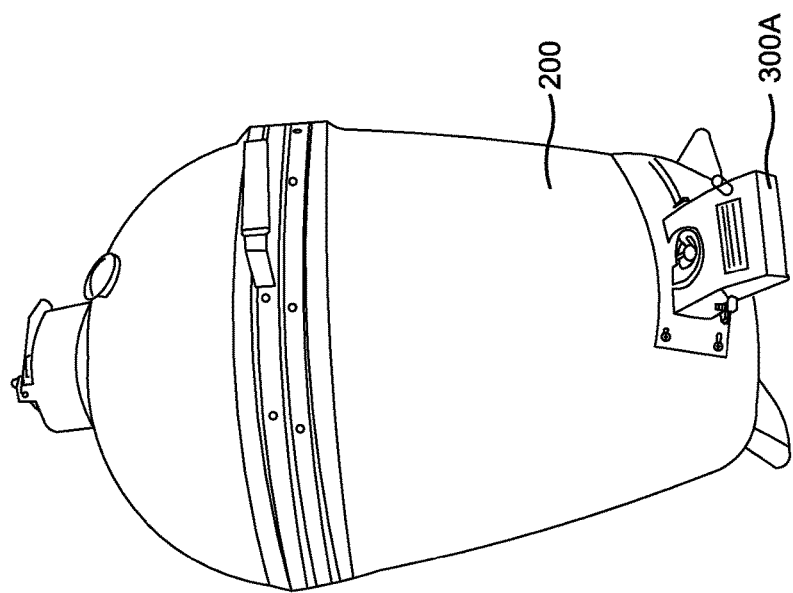
FIGS. 4A and 4B are diagrams of an example implementation of how a control device may operate and attach to a grill.
Figure 4B:
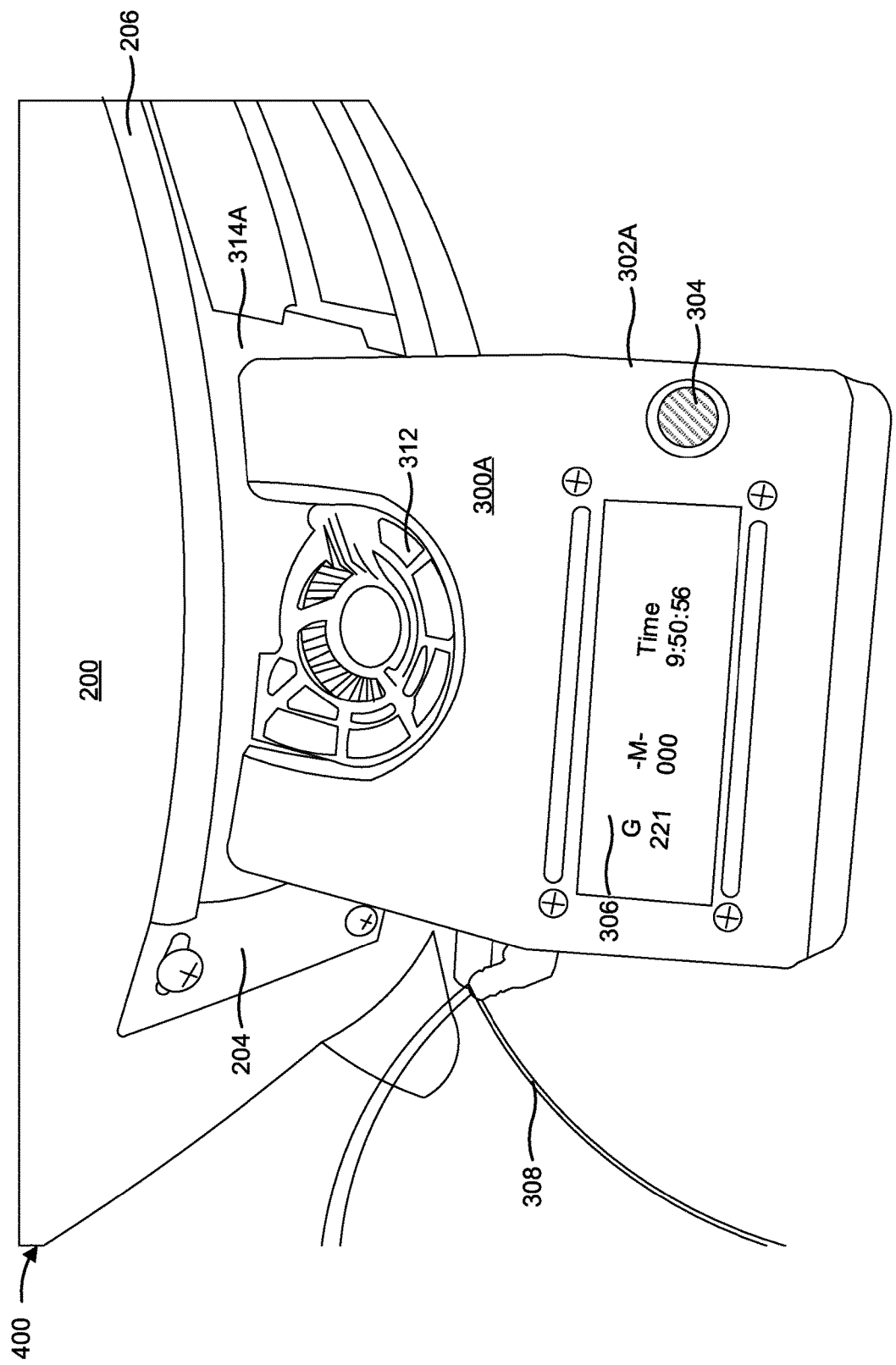

FIGS. 4A and 4B are diagrams of an example implementation 400 of how control device 300A may operate and attach to grill 200. As shown in FIG. 4A, control device 300A may attach to a lower portion of grill 200. FIG. 4B shows a zoomed in view of FIG. 4A.

As shown in FIG. 4B, plate 314A may be inserted into track 206 of draft assembly 204. Plate 314A may be positioned on draft assembly 204 to cover or overlap draft opening 208. Control device 300A may protrude from draft assembly 204 when attached. Plate 314A may be removed from track 206 to detach control device 300A from grill 200. In this way, control device 300A may be easily attached to and detached from grill 200.

Processor 326 may control a blower speed of blower 312 to adjust an airflow rate of air that blower 312 blows into grill 200 when control device 300A is attached to grill 200.

As indicated above, FIGS. 4A and 4B are provided merely as an example. Other examples are possible and may differ from what was described with regard to FIGS. 4A and 4B.

FIGS. 5A and 5B are diagrams of an example implementation 500 of how control device 300B may operate and attach to grill 200. As shown in FIG. 5A, control device 300B may attach to grill 200 by inserting plate 314B into track 206 of draft assembly 204. Plate 314B may be positioned on draft assembly 204 such that plate 314B does not cover draft opening 208. Control device 300B may protrude from draft assembly 204 when attached. Plate 314B may be removed from track 206 to detach control device 300B from grill 200. In this way, control device 300B may be easily attached to and detached from grill 200.

Actuator 316 may attach to draft door 210. For example, actuator 316 may include end 322 configured to hook into, fit into, wrap around, or otherwise attach to a handle of draft door 210. Additionally, or alternatively, actuator 316 may attach to draft door 210 using a magnet, a suction cup, a latch, or the like. In some implementations, draft door 210 may be replaced with a sliding door that is fixed to actuator 316.

As shown in FIG. 5A, draft door 210 may be set to a position directly adjacent to draft opening 208 such that draft opening 208 is completely uncovered by draft door 210. A distance Y may represent the height of draft opening 208. The distance Y may be fixed. A length X may represent a distance between an edge of draft door 210 and far edge of draft opening 208. The length X may be measured in a direction that draft door 210 slides along track 206. For example, the length X may represent a horizontal distance of an uncovered portion of draft opening 208 (e.g., a portion of draft opening 208 that is not covered by draft door 210).

As shown in FIG. 5B, actuator 316 may extend shaft 320 to push draft door 210 along track 206 to partially cover draft opening 208. As can be seen, the length X, representing the uncovered portion of draft opening 208, is shorter than the length X in FIG. 5A. Actuator 316 may push and pull draft door 210 along track 206 to adjust a size of an uncovered portion of draft opening 208, thereby controlling an airflow into grill 200.

In some implementations, control device 300B may be calibrated before use. The calibration may include setting a reference length for shaft 320. For example, a user may initially position draft door 210 along track 206 such that a far edge of draft door 210 (e.g., an edge farthest from motor 318) is even with a far edge of draft opening 208 (e.g., an edge farthest from motor 318) such that draft door 210 completely covers draft opening 208. For example, the length X may equal 0 at this initial position of draft door 210. Processor 326 may detect an extension length that shaft 320 extends at this initial position of draft door 210, and set this extension length of shaft 320 as the reference length.

In some implementations, the calibration may include setting a draft opening length (Xmax) that represents a length of draft opening 208 in the direction that draft door 210 slides. In other words, the draft opening length (Xmax) may represent a maximum amount that draft opening 208 may be uncovered. In some implementations, a user may input information indicating the draft opening length (Xmax) and control device 300B may set the draft opening length based on the input information. Additionally, or alternatively, control device 300B may store information indicating a draft opening length for different grills 200. A user may input a make and/or model of grill 200 to be used and control device 300B may set the draft opening length (Xmax) based on the stored information and the make and/or model of grill 200. Additionally, or alternatively, a user may position draft door 210 along track 206 such that the far edge of draft door 210 is even with or adjacent to a near edge of draft opening 208 (e.g., an edge nearest to motor 318). In other words, the user may position draft door 210 along track 206 such that draft door completely uncovers draft opening 208 as shown in FIG. 5A. Control device 300B may determine the draft opening length (Xmax) based on the extension length of shaft 320 at this position of draft door 210 and the reference length.

As indicated above, FIGS. 5A and 5B are provided merely as an example. Other examples are possible and may differ from what was described with regard to FIGS. 5A and 5B.

Figure 6:
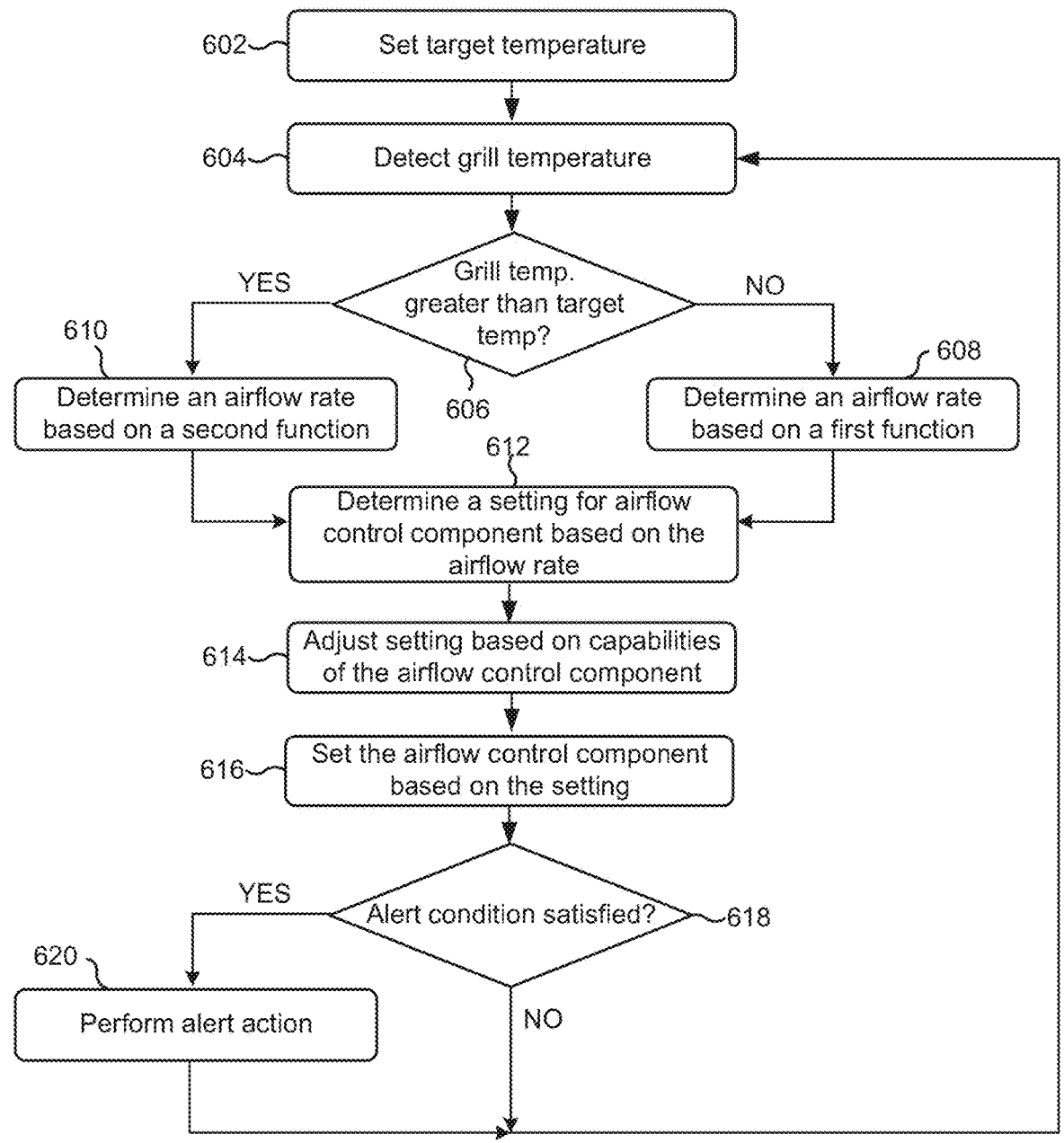
FIG. 6 is a flow chart of an example process for setting an airflow control component of a control device to control a temperature of a grill.

FIG. 6 is a flow chart of an example process for setting an airflow control component of the control device to control a temperature of the grill. In some implementations, one or more process blocks of FIG. 6 may be performed by control device 300 (e.g., control device 300A and/or control device 300B).

As shown in FIG. 6, process 600 may include setting a target temperature (block 602). For example, control device 300 may set the target temperature based on a user input.

In some implementations, output component 306 (e.g., a display) may prompt a user of control device 300 to input a target temperature. The target temperature may be a desired temperature for the grill temperature that the user desires to use for cooking. The user may input information indicating the target temperature via input component 304. For example, input component 304 may be a knob that the user turns to set the target temperature, a keyboard or keypad that the user uses to enter the target temperature, or the like. Control device 300 may determine the target temperature based on the user input. In some implementations, output component 306 may display or otherwise output the target temperature for the user's reference.

As further shown in FIG. 6, process 600 may include detecting a grill temperature (block 604). For example, control device 300 may detect the grill temperature based on a temperature detected by grill temperature sensor 308. The grill temperature may be a temperature of the grill at a particular time that grill temperature sensor 308 detects a temperature. The grill temperature may change over time.

In some implementations, grill temperature sensor 308 may be inserted into grill 200 through vent 216. Grill temperature sensor 308 may detect the grill temperature and send a signal to processor 326 indicating the grill temperature. Output component 306 may display or otherwise output the grill temperature for the user's reference.

In some implementations, food temperature sensor 310 may be inserted into grill 200 and into food being cooked by grill 200. Food temperature sensor 310 may detect the food temperature and send a signal to processor 326 indicating the food temperature. Output component 306 may display or otherwise output the food temperature for the user's reference. Output component 306 may display the target temperature, the grill temperature, and/or the food temperature at a same time.

As further shown in FIG. 6, process 600 may include determining whether the grill temperature is greater than the target temperature (block 606). For example, control device 300 may determine whether the grill temperature is greater than the target temperature based on processor 326 comparing the target temperature and the grill temperature.

As further shown in FIG. 6, when the grill temperature is not greater than the target temperature (block 606—NO), process 600 may include determining an airflow rate based on a first function (block 608). For example, when the grill temperature is less than or equal to the target temperature, processor 326 may determine the airflow rate based on a first function that quickly raises the grill temperature without exceeding the target temperature. An airflow rate may indicate an amount or volume of air per unit of time. For example, the airflow rate may be measured in cubic feet per minute ($FT^3$/min).

The first function may be used to determine an airflow rate (VolInput) based on factors including the target temperature (tarTemp), the grill temperature (grillTemp), a control error integrator value ($\sigma_t$), a proportional gain constant (K1), and/or an integrator constant (K2). In some implementations, the first function may be represented by equation 1:

$$\text{VolInput} = K1*(\text{tarTemp}-\text{grillTemp}) + K2*\sigma_t \quad (1)$$

Where the error integrator value ($\sigma_t$) may be represented by equation 2:

$$\sigma_t = \sigma_{t-1} + t*(\text{tarTemp}-\text{grillTemp}) \quad (2)$$

The error integrator value ($\sigma_t$) may grow as a function of time (t). For example, the error integrator value ($\sigma_t$) may increase the longer the grill temperature is below the target temperature.

The proportional gain term "K1*(tarTemp-grillTemp)" in the first function may represent an airflow rate that serves to quickly raise a grill temperature (e.g., more quickly than a single-speed fan). However, the proportional gain constant (K1) may be set to a value that would cause the grill temperature to stabilize at a temperature below the target temperature if the proportional gain term were used alone in the first function. The integrator term "K2*$\sigma_t$" is added to the proportional gain term to provide a fine adjustment to the airflow rate (VolInput) to raise the grill temperature the remaining about (e.g., the last one degree, 5 degrees, 10 degrees, etc.) to stabilize the grill temperature at the target temperature. Because the integrator term is determined based on the error integrator value ($\sigma_t$), which increases as a function of time, the airflow rate represented by the integrator term may also increase as a function of time.

The proportional gain constant (K1) and the integrator constant (K2) may be constants determined based on factors including a volume and/or size of grill 200, a material of grill 200, and/or a time constant of the grill (e.g., an amount of time it takes the grill temperature of grill 200 to reflect the changes in the airflow rate and stabilize at a temperature). The time constant of the grill may be determined through experimentation with a particular grill 200 by controlling a blower speed and measuring a temperature difference over time. In some implementations, the time constant may be in a range of 5 minutes to 20 minutes depending on the particular grill 200. For example, the time constant may be approximately 10 minutes. However, the time constant may be outside of this range.

In some implementations, the proportional gain constant (K1) may be larger than the integrator constant (K2). Assuming the airflow rate (VolInput) is in units of $FT^3$/min, the target temperature (tarTemp) and grill temperature (grillTemp) is in units of ° F., and time (t) is in units of seconds, then the proportional gain constant (K1) may be in a range of values between 0.05 and 0.40 depending on grill size, and the integral constant (K2) may be in a range of values between 0.0001 and 0.0050. In some implementations, the values of the proportional gain constant (K1) and the integral constant (K2) may be outside of these ranges depending on the particular grill used. In this way, the proportional gain term provides a macro contribution to the airflow rate while the integrator term provides a micro contribution to the airflow rate.

In some implementations, the proportional gain constant (K1) and the integrator constant (K2) may be preset and stored by memory 328. Additionally, or alternatively, multiple values for the proportional gain constant (K1) and the integrator constant (K2) may be stored by memory 328. Memory 328 may store an association between each of the proportional gain constants (K1) and integrator constants (K2) with a grill size, a grill volume, a grill material, and/or a grill make/model. When setting up control device 300, the user may input information, via input component 304, indicating the grill size, the grill volume, the grill material, and/or the make/model of grill 200 to be used with control device 300. Control device 300 may select a value for proportional gain constant (K1) and the integrator constant (K2) that is associated with the grill size, the grill volume, the grill material, and/or the grill make/model of grill 200. In this way, control device 300 may be customized for different grills 200.

As further shown in FIG. 6, when the grill temperature is greater than the target temperature (block 606—YES), process 600 may include determining airflow rate based on a second function (block 610). For example, when the grill temperature is greater than the target temperature, processor 326 may determine the airflow rate based on a second function that stabilizes the grill temperature by reducing the airflow rate or stopping airflow into grill 200.

The second function, which is different from the first function, may be used to determine the airflow rate (VolInput) based on factors including the target temperature (tarTemp), the grill temperature (grillTemp), the proportional gain constant (K1), and/or a non-integration constant (K3). In some implementations, the second function may be represented by equation 3:

$$\text{VolInput} = K1*(\text{tarTemp} - \text{grillTemp} + 1) + K3 \quad (3)$$

When the grill temperature is above the target temperature, the second function may gradually decrease the airflow rate, based on a difference between the target temperature and the grill temperature, to avoid sudden and large drops in the grill temperature and to stabilize the grill temperature at the target temperature without (or minimizing) grill temperature oscillation around the target temperature.

The non-integration constant (K3) may be a constant determined based on factors including a volume and/or size of grill 200, a material of grill 200, and/or a time constant of the grill (e.g., an amount of time it takes the grill temperature of grill 200 to reflect the changes in the airflow rate and stabilize at a temperature). In some implementations, the non-integration constant (K3) may be preset and stored by memory 328. Additionally, or alternatively, multiple values for the non-integration constant (K3) may be stored by memory 328. Memory 328 may store an association between each of the values for the non-integration constant (K3) with a grill size, a grill volume, a grill material, and/or a grill make/model. When setting up control device 300, the user may input information, via input component 304, indicating the grill size, the grill volume, the grill material, and/or the grill make/model of grill 200 to be used with control device 300. Control device 300 may select a value for non-integration constant (K3) that is associated with the grill size, the grill volume, the grill material, and/or the grill make/model of grill 200. In this way, control device 300 may be customized for different grills 200.

As further shown in FIG. 6, process 600 may include determining a setting for airflow control component 334 based on the airflow rate (block 614). For example, processor 326 may determine a setting for airflow control component 334 that causes air to enter grill 200, via draft opening 208, at the determined airflow rate.

In some implementations (e.g., for control device 300A), processor 326 may determine a blower speed for blower 312 based on the airflow rate. The blower speed may be a setting that causes blower 312 to blow or force air into grill 200 at the determined airflow rate.

In some implementations (e.g., for control device 300B), processor 326 may determine a setting for actuator 316 (e.g., an extension length for shaft 320) based on the airflow rate. For example, processor 326 may determine a length X of draft opening 208 that is to be uncovered by draft door 210 that permits air to flow into grill 200 at the determined airflow rate. As discussed above with respect to FIGS. 5A and 5B, the length X may be in a direction (e.g., a horizontal direction) that draft door 210 slides along track 206. The length X may be determined based on the determined airflow rate (VolInput), the length (Y) (e.g., a length of draft opening 208 in a direction perpendicular to the direction draft door 210 slides), the grill temperature (grillTemp), and a scaling factor (K4). The scaling factor (K4) may be a constant. For example, the length X may be determined based on equation 4:

$$X = \left( \frac{VolInput}{Y(grillTemp)(K4)} \right)^{1/2} \quad (4)$$

Processor 326 may determine the extension length for shaft 320 based on the length X determined to cause the airflow rate and based on the reference length for shaft 320. For example, processor 326 may determine a setting for actuator 316 to cause shaft 320 to be extended to a length equal to the reference length (e.g., a length that causes draft door 210 to completely cover draft opening 208) minus the length X.

As further shown in FIG. 6, process 600 may include adjusting the setting based on capabilities of airflow control component 334 (block 614). For example, processor 326 of control device 300 may apply a limiter function to the setting based on capabilities of airflow control component 334.

In some implementations (e.g., for control device 300A), the limiter function may be a function that limits a blower speed to the limits of blower 312. For example, blower 312 may have a maximum blower speed that blower 312 is capable of operating (e.g., a maximum volume of air per unit of time that may be output by blower 312). Blower 312 may have a minimum blower speed that blower 312 is capable of operating (e.g., a minimum volume of air per unit of time that may be output by blower 312). The minimum blower speed may be a value greater than zero.

Processor 326 may compare the blower speed determined at block 612 to the maximum blower speed and the minimum blower speed. If the blower speed is determined to be greater than or equal to the maximum blower speed, processor 326 may change the blower speed to be equal to the maximum blower speed. If the blower speed is determined to be less than or equal to the minimum blower speed, processor 326 may change the blower speed to be equal to 0. For example, processor 326 may turn blower 312 off if the blower speed is less than or equal to the minimum blower speed.

In some implementations (e.g., for control device 300B), the limiter function may be a function that limits an extension length of shaft 320 based on a size of draft opening 208. For example, actuator 316 may have a maximum extension length for shaft 320 equal to the reference length because draft door 210 completely covers draft opening 208 when shaft 320 is at the reference length. Actuator 316 may have a minimum extension length for shaft 320 equal to the reference length minus the length of draft opening 208 (Xmax) because draft opening 208 is completely uncovered by draft door 210 at this extension length for shaft 320.

Processor 326 may compare the extension length for shaft 320 determined at block 612 to the maximum extension length and the minimum extension length. If the extension length is determined to be greater than or equal to the maximum extension length, processor 326 may change the extension length to be equal to the maximum extension length. If the extension length is determined to be less than or equal to the extension length, processor 326 may change the extension length to be equal to the minimum extension length. Limiting the extension length to be between the maximum extension length and the minimum extension length may conserve power by preventing movement of draft door 210 outside of a range that influences airflow into grill 200. Additionally, or alternatively, limiting the extension length to be between the maximum extension length and the minimum extension length may prevent actuator 316 from pushing or pulling draft door 210 off track 206.

As further shown in FIG. 6, process 600 may include setting airflow control component 334 based on the control setting (block 616). For example, processor 326 may send a control signal to airflow control component 334 that causes airflow control component 334 to be set to the setting.

In some implementations (e.g., for control device 300A), processor 326 may send a PWM signal to the PWM motor included in blower 312. Based on the PWM signal, the PWM motor may change a rotational speed of the fan blades included in blower 312 to a rotational speed that causes the determined volume of air per unit of time to be output from blower 312. In this way, control device 300A may automatically set blower 312 to a blower speed from among a number of possible blower speeds.

In some implementations (e.g., for control device 300B), processor 326 may send a control signal to actuator 316 that causes motor 318 to extend or retract shaft 320 to the determined extension length. When shaft 320 is extended to the determined extension length, actuator 316 may move draft door 210 to leave a length X of draft opening 208 uncovered, thereby allowing air to flow into grill 200 at the determined airflow rate. In this way, control device 300B may automatically set shaft 320, of actuator 316, to an extension length from among a number of possible extension lengths for shaft 320.

As further shown in FIG. 6, process 600 may include determining if an alert condition is satisfied (block 618). For example, processor 326 of control device 300 may determine if the alert condition is satisfied.

An alert condition may include a food condition satisfied when a desired food temperature is reached. For example, a user may input or select a desired food temperature via input component 304. Processor 326 may determine the food condition is satisfied when the food temperature detected by food temperature sensor 310 is equal to or near the desired food temperature.

An alert condition may include a pre-heat condition satisfied when the grill temperature reaches the target temperature for the first time and/or when the grill temperature has been within a particular error margin (e.g., a particular number of degrees or a particular percentage of the target temperature) for a threshold amount of time (e.g., 30 seconds, 1 minute, 5 minutes, etc.). Processor 326 may determine the pre-heat condition is satisfied when the grill temperature detected by grill temperature sensor 308 reaches the target temperature for the first time and/or when the grill temperature has been within a particular error margin for a threshold amount of time.

An alert condition may include an error condition satisfied when the grill temperature is less than the target temperature for a threshold amount of time or when the grill temperature is a threshold amount (e.g., a particular number of degrees or a particular percentage of the target temperature) below the target temperature for a threshold amount of time. For example, if lid 212 is left open, if lid 212 is not properly placed on grill 200, or if the fuel burns out (or otherwise fails to provide enough heat), the grill temperature may constantly be below the target temperature regardless of the operation by control device 300 to increase the grill temperature.

Additionally, or alternatively, the error condition may be satisfied when the grill temperature is greater than the target temperature by a threshold amount, when the grill temperature is greater than the target temperature for a threshold amount of time, or when the grill temperature is a threshold amount above the target temperature for a threshold amount of time. For example, the charcoal may flare-up and produce more heat than desired due to wind, food catching on fire, movement of burning charcoals, or other environmental factors. The flare-up may increase the grill temperature above the target temperature to an extent that regardless of the operation of control device 300 to reduce the grill temperature, the grill temperature may take a longer than desired amount of time to stabilize back to the target temperature. Processor 326 may determine whether the error condition is satisfied based on comparing the grill temperature and the target temperature over a period of time.

As further shown in FIG. 6, when no alert condition is satisfied (block 618—NO), process 600 may return to block 604 to detect the grill temperature.

As further shown in FIG. 6, when an alert condition is satisfied (block 618—YES), process 600 may include performing an alert action (block 620). For example, control device 300 may output an alert indicating a particular alert condition is satisfied. Control device 300 may output the alert via output component 306 (e.g., for display on a display device and/or a sound via a speaker).

In some implementations, control device 300 may output the alert via communication interface 332. For example, control device 300 may send a text message (e.g., a short message service (SMS) message or a multimedia message service (MMS) message), an email, an instant message, or the like to contact information associated with the user. In some implementations, an application (e.g., a web application, a mobile application, etc.) may be provided to a user. The application may allow the user to check the status of control device 300. For example, control device 300 may send, via communication interface 332, alerts, grill temperature information, target temperature information, food temperature information, cooking time information, or the like to a user via the application. In some implementations (e.g., for control device 300A), the user may be able to turn blower 312 on or off, or control a blower speed of blower 312 by sending a command, via the application, to control device 300A via communication interface 332. Additionally, or alternatively, for control device 300B, the user may be able to cause actuator 316 to move draft door 210 to a desired position by sending a command, via the application, to control device 300B via communication interface 332.

In some implementations, an alert action may include turning off blower 312, reducing a speed of blower 312, or setting actuator 316 to move draft door 210 to fully cover, partially cover, or uncover draft opening 208. For example, if the food condition is satisfied and the food being cooked is at the desired temperature, control device 300 may turn off blower 312 or cause actuator 316 to fully cover draft opening 208 to stop airflow into grill 200.

Process 600 may return to block 604 to detect the grill temperature after the alert condition is performed. In some implementations, control device 300 may wait a particular amount of time before returning to block 604. For example, control device 300 may wait one second, 10 seconds, 30 seconds, one minute, etc. before returning to block 604 and repeating process 600. Waiting may conserve power by conserving processing resources and by limiting how often airflow control component 334 is adjusted. Waiting may have no or minimal impact on the grill temperature due to the delay between when airflow control component 334 is set and when the grill temperature changes or stabilizes due to the airflow control component 334 being set. Control device 300B may use less power than control device 300A because it may take less power to occasionally move draft door 210 using actuator 316 than to keep blower 312 operating at particular speeds.

In some implementations, control device 300A may include a manual mode and an automatic mode. The automatic mode may correspond to blocks 602-616 where control device 300A automatically sets a blower speed. The manual mode may allow the user to manually set, via input component 304, a blower speed for blower 312. The user may switch between the manual mode and the automatic mode.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Implementations described herein provide a temperature controller with an airflow control component that is adjustable to control different airflow rates into a grill to keep a grill temperature constant. Additionally, or alternatively, the temperature controller may control airflow into the grill to avoid temperature spikes above a target temperature and to quickly increase a grill temperature when the grill temperature is below the target temperature.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a blower configured to blow air into a grill,
      the blower being adjustable to operate at a plurality of blower speeds; and
   one or more processors to:
      set a target temperature for the grill,
      detect a grill temperature of the grill,
      determine a blower speed, from among the plurality of blower speeds, based on the target temperature, the grill temperature, and an error integrator value that increases as a function of time,
         where the error integrator value is determined based on $\sigma_{t-1} + t^*(tarTemp - grillTemp)$,
            where $\sigma_t$ is the error integrator value, t is a time value, tarTemp is the target temperature, and grillTemp is the grill temperature,
         where the one or more processors, when determining the blower speed, are to:
            when the grill temperature is less than the target temperature, adjust the blower speed based on a first function that uses the error integrator value, and
            when the grill temperature is greater than the target temperature, adjust the blower speed based on a second function that is independent of the error integrator value; and
      set the blower to the blower speed to control an airflow into the grill.

2. The device of claim 1, where the blower includes a motor, and
   where the one or more processors, when setting the blower to the blower speed, are to send a pulse width modulation (PWM) signal to the motor.

3. The device of claim 1, where the one or more processors are further to:
   compare the blower speed and a maximum blower speed at which the blower is capable of operating; and
   set the blower speed to the maximum blower speed when the blower speed is greater than the maximum blower speed.

4. The device of claim 1, where the one or more processors are further to:
   compare the blower speed and a minimum blower speed at which the blower is capable of operating,
      the minimum blower speed being greater than zero; and
   turn the blower off when the blower speed is less than the minimum blower speed.

5. The device of claim 1, where the one or more processors, when setting the blower to the blower speed, are to:
   continually adjust the blower speed to multiple different blower speeds, of the plurality of blower speeds, based on a difference between the target temperature and the grill temperature.

6. The device of claim 1, further comprising:
   an attachment component configured to attach the device to the grill; and
   a temperature sensor configured to detect the grill temperature of the grill.

7. A method comprising:
   setting, by a device, a target temperature for a grill;
   detecting, by the device, a grill temperature of the grill;
   determining, by the device, a blower speed for a blower configured to blow air into the grill, from among a plurality of blower speeds, based on the target temperature, the grill temperature, and a value that changes as a function of time,
      where the value that changes as a function of time is determined based on $\sigma_{t-1} + t^*(tarTemp - grillTemp)$,
         where $\sigma_t$ is the value that changes as a function of time, t is a time value, tarTemp is the target temperature, and grillTemp is the grill temperature,
      where the blower is adjustable to operate at the plurality of blower speeds, and
      where determining the blower speed includes:
         when the grill temperature is less than the target temperature, adjusting the blower speed based on a first function that uses the value that changes as a function of time, and
         when the grill temperature is greater than the target temperature, adjusting the blower speed based on a second function that is independent of the value that changes as a function of time;
   setting, by the device, the blower to the blower speed to control an airflow into the grill; and
   causing, by the device, the blower to blow air based on setting the blower to the blower speed.

8. The method of claim 7, where determining the blower speed includes:
   determining whether the grill temperature is greater than the target temperature; and
   selectively determining the blower speed based on the first function or based on the second function that is different from the first function.

9. The method of claim 8, where the first function is equal to:

$$VolInput = K1^*(tarTemp - grillTemp) + K2^*\sigma_t$$

where VolInput is an airflow rate, K1 is a first constant, and K2 is a second constant.

10. The method of claim 8, where the second function is equal to:

$$\text{VolInput} = K1*(\text{tarTemp}-\text{grillTemp}+1)+K3$$

where VolInput is an airflow rate, K1 is a first constant, and K3 is a second constant.

11. The method of claim 8, further comprising:
storing association information associating a plurality of different grills with a plurality of different values used to determine the blower speed;
receiving information identifying the grill;
determining a value associated with the grill, from among the plurality of different values, based on the information identifying the grill and the association information;
determining a customized function for the grill that calculates the blower speed based on the value associated with the grill; and
where the determining the blower speed includes:
determining the blower speed based on the customized function for the grill.

12. The method of claim 7, where the blower includes a motor, and
where setting the blower to the blower speed includes:
sending a pulse width modulation (PWM) signal to the motor.

13. A non-transitory computer-readable medium storing instructions, the instructions comprising:
one or more instructions that, when executed by one or more processors, cause the one or more processors to:
set a target temperature for a grill,
detect a grill temperature of the grill,
determine a blower speed for a blower configured to blow air into the grill, from among a plurality of blower speeds, based on the target temperature, the grill temperature, and a value that increases as a function of time,
where the value that increases as a function of time is determined based on $\sigma_{t-1}+t*(\text{tarTemp}-\text{grillTemp})$,
where $\sigma_t$ is the value that increases as a function of time, t is a time value, tarTemp is the target temperature, and grillTemp is the grill temperature,
where the blower is adjustable to operate at the plurality of blower speeds, and
where the one or more instructions, when executed by the one or more processors to determine the blower speed, are to:
when the grill temperature is less than the target temperature, adjust the blower speed based on a first function that uses the value that increases as a function of time, and
when the grill temperature is greater than the target temperature, adjust the blower speed based on a second function that is independent of the value that increases as a function of time; and
set the blower to the blower speed to control an airflow into the grill.

14. The non-transitory computer-readable medium of claim 13, where the blower includes a motor, and
where the one or more instructions, when executed by the one or more processors to set the blower to the blower speed, cause the one or more processors to:
send a pulse width modulation (PWM) signal to the motor.

15. The non-transitory computer-readable medium of claim 13, where the one or more instructions, when executed by the one or more processors, further cause the one or more processors to:
compare the blower speed and a maximum blower speed at which the blower is capable of operating; and
set the blower speed to the maximum blower speed when the blower speed is greater than the maximum blower speed.

16. The non-transitory computer-readable medium of claim 13, where the one or more instructions, when executed by the one or more processors, further cause the one or more processors to:
compare the blower speed and a minimum blower speed at which the blower is capable of operating,
the minimum blower speed being greater than zero; and
turn the blower off when the blower speed is less than the minimum blower speed.

17. The method of claim 10, where K1 is a non-zero value and K3 is a non-zero value,
where K1 and K3 are set based on at least one of:
a volume of the grill,
a size of the grill,
a material of the grill, or
a make or model of the grill.

* * * * *